Nov. 27, 1962
L. J. NOWAK, JR
3,065,842
DISTRIBUTING SUPPLY FEEDER
Filed March 30, 1959
2 Sheets-Sheet 1
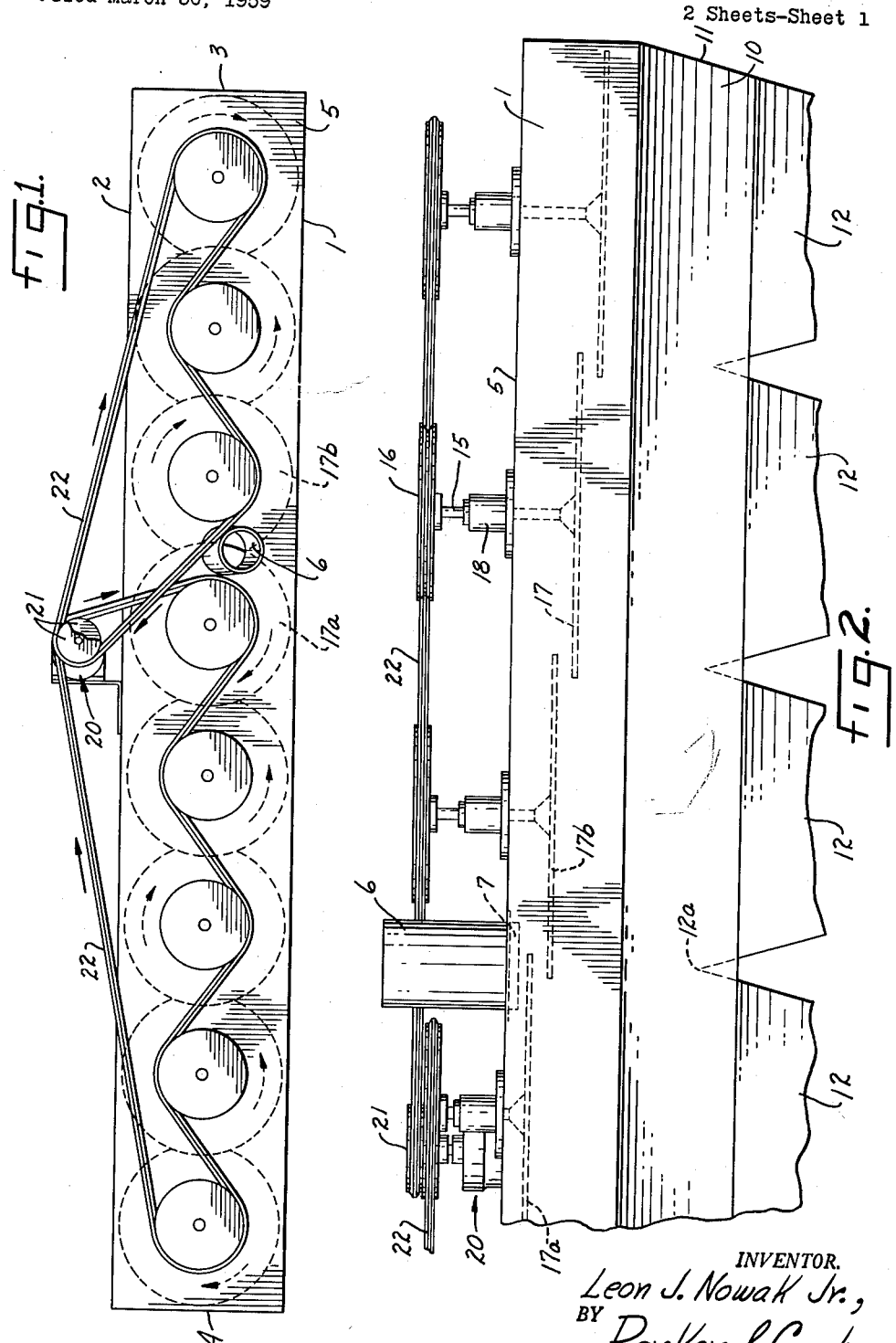
INVENTOR.
Leon J. Nowak Jr.,
BY Parker & Carter
Attorneys.

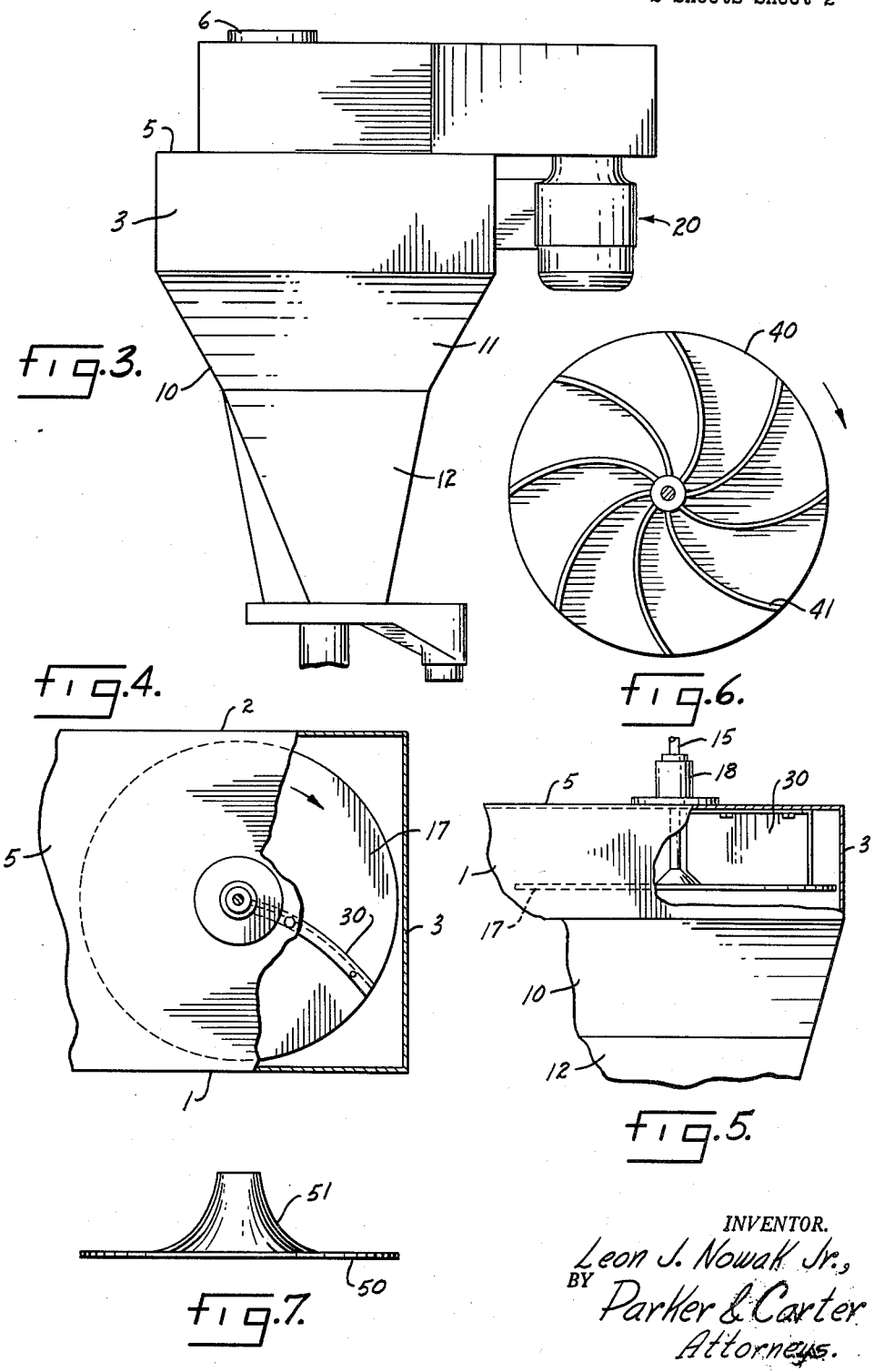

United States Patent Office 3,065,842
Patented Nov. 27, 1962

3,065,842
DISTRIBUTING SUPPLY FEEDER
Leon J. Nowak, Jr., Park Ridge, Ill., assignor to B. F. Gump Co., Chicago, Ill., a corporation of Illinois
Filed Mar. 30, 1959, Ser. No. 802,766
15 Claims. (Cl. 198—128)

My invention relates to an improvement in feeding means and has for one purpose to provide a distributing supply feeder and method of feeding whereby, from a source of supply, feed may be distributed simultaneously to a plurality of feed receiving outlets.

Another purpose is to provide improved means for distributing feed to a plurality of feed receiving mechanisms.

Another purpose is to provide improved feeding means for simultaneously distributing feed to a plurality of outlets.

Another purpose is to provide improved feeding means for centrifugally feeding material to a plurality of outlets.

Another purpose is to provide means for distributing feed from one or a small number of feed discharge means to a larger number of feed receiving means.

Another purpose is to provide means for feeding material to a number of outlets in such a way that material within the feeder will not pack, even though the withdrawal of material from one or more or all of the outlets is interrupted.

Other purposes will appear from time to time in the course of the specification and claims.

I illustrate my invention more or less diagrammatically in the accompanying drawings wherein:

FIGURE 1 is a plan view of a typical installation;

FIGURE 2 is a partial side elevation, on a somewhat larger scale, of the structure shown in FIGURE 1;

FIGURE 3 is an end view of the structure shown in FIGURE 1;

FIGURE 4 is a plan view, with parts broken away, on an enlarged scale, of a modification;

FIGURE 5 is a partial side elevation, with parts broken away, of the structure shown in FIGURE 4;

FIGURE 6 is a plan view of one form of feed distributing means; and

FIGURE 7 is a side elevation of another form of feed distributing means.

Like parts are indicated by like symbols throughout the specification and drawings.

Referring, first, to FIGURES 1 to 3, inclusive, I illustrate a feed receiving and distributing housing which is shown as including generally upright side and end walls. The side wall 1 is shown in elevation in FIGURE 2, it being understood that, as a matter of convenience, the particular installation shown in FIGURES 1 and 2 has parallel elongated sides, as at 1 and 2, connected by substantially shorter ends 3 and 4. A top cover may be employed, as at 5 in FIGURE 1. Extending upwardly from the cover is any suitable feed spout or delivery means 6. It may be in the form of a slightly inclined tube, the lower end of which, as at 7, delivers to the interior of the feed distribution housing a stream of divided or granular or powdered material for distribution.

Extending downwardly from the generally upright walls 1 to 4, inclusive, are inwardly convergent side walls 10 and end walls 11. These define a space above and serve to direct material to a plurality of downspouts or feed directing or receiving members 12. These feed directing means 12 may be in the form of cones or inverted pyramids, or the like, of any form suitable to direct the material fed in a zone of downward concentration. The end result is that a single stream of material fed downwardly through the spout or tube or pipe 6 is substantially simultaneously distributed for downward delivery along the various members 12. This feed arrangement may be used for various purposes, but is advantageous, for example, where a sequence or plurality of weighing devices are intended to receive simultaneously material to be weighed, or where a plurality of containers are intended simultaneously to be filled. Since the details of the containers filled, or of the weighing means employed, do not of themselves form any part of the present invention they are not herein described.

Assume that in the form of FIGURES 1 to 3, inclusive, a total of eight feed receiving members 12 are employed, the single tube 6 may be employed to deliver the feed to be distributed to all eight of the feed receiving members 12. However, it will also be understood that more than one feed delivering member 6, or its equivalent, may be employed, and that any suitable variation may be made in the number of the feed receiving members 12. In the form of FIGURES 1 to 3, inclusive, however, I illustrate an exemplification of the invention. A single feed spout 6 delivers the feed for simultaneous distribution to eight of the feed receiving members or hoppers 12. In order to obtain this distribution I employ a plurality of simultaneously rotatable spinners or feed distributors, each of which may include an axle or shaft 15, a driving pulley 16, and a feed distributing member 17. Any suitable bearing means may be employed, and I illustrate, more or less diagrammatically, bearing assemblies 18, which are shown as mounted on and projecting upwardly from the cover plate or top closure 5.

In FIGURES 1 and 2 I illustrate the members 17 as, in effect, flat disks. I illustrate means for simultaneously rotating the disks 17 in alternately opposite directions of rotation, but this is not necessary. I may employ, for example, any suitable motor assembly, generally indicated at 20, as in FIGURE 3, which drives one or more driving pulleys 21. The driven pulleys 16 may be driven by the driving pulleys 21 by one or more belts 22 which pass about the driven pulleys 16. A practical disposition of belting is shown in FIGURES 1 and 2. The belt or belts are shown as so wound as to alternate their driving relationship to the driven pulleys 16 in such fashion as to cause each pair of adjacent shafts 15, and thus each adjacent pair of disks 17, to rotate in opposite directions of rotation. I may depart from this arrangement, but, under some circumstances, I find it advantageous.

It will be noted, as in FIGURE 2, that, as to each pair of disks 17, there is an overlying disk and an underlying disk. It will also be noted that the highest of these various disks, shown at 17a, has its edge underlying and adapted to receive feed from the spout or down-pipe 6. Similarly, the adjacent disk 17b not only underlies the edge of the disk 17a but may, if desired, be positioned to receive feed delivered downwardly through the spout 6. The feeding point is not critical, and can be put any-where in the system. The disks 17a and 17b are so disposed that, between them, they receive the entire downward feed discharge of the spout 6. Referring to the position of disks 17a and 17b in FIGURE 1, it will be evident that disk 17a will convey the material toward the left end of the assembly, referring to the position of the parts in FIGURE 1, whereas the disk 17b will convey material toward the right end of the assembly. The initial material receiving disks 17a and 17b rotate at a higher plane than the disk next to the left of 17a and next to the right of 17b. From then on, toward each end of the assembly, each additional disk is arranged at a lower level. Only the right end of the assembly is shown in FIGURE 2, but if the left end were shown the relationship would be the reverse of that shown in FIGURE 2, with each disk to the left being lower than the disk next to it at the right, the end disks at each end of the installation being the lowest of all. By this means material delivered to 17a or to 17b will pass progressively over a sequence of disks for distribution over the edges of the series of disks. It will be understood that the disks are so sized and proportioned, and are rotated at such speed, that while some of the material is delivered on down the series there is a substantially equal over-edge loss from each disk received by the various feed receiving funnels or spouts 12. Some of the material escapes over the disk edges without passing to the succeeding disk, and it is downwardly directed by the inclined walls 10 and 11 into the series of receiving funnels 12. It will be understood, of course, that the funnels are separated by a knife edge connection shown, for example, in dotted line at 12a in FIGURE 2. Thus all of the material fed passes into one or another of the material receiving funnels 12, and the distribution to the various funnels is preferably substantially equal.

I may use any suitable driving and driven sheaves or pulleys. I illustrate them, however, as circumferentially channeled. Since opposite sides of the belting 22 alternately engage adjacent pulleys 16, any suitable reversing drive belting may be employed, that is to say, belting, either side of which is formed and adapted to engage and drive a pulley or sheave. I may, of course, use gears or chain drives or any other suitable driving means.

In the form of FIGURES 1 and 2 I illustrate but a single downspout or feed chute 6, which, however, delivers to two rotating disks 17a and 17b. I may break the series of disks into smaller groups, with a suitable feed delivering means for each group; or I may deliver the entire feed to a single disk and have that disk deliver directly to one or more preferably underlying disks. While I find it advantageous to have the disks arranged at different levels, with the receiving disk underlying the disk which delivers to it, I may, at certain speeds of rotation, dispense with the overlap and rely upon centrifugal delivery alone, or in part to deliver material across a gap dividing the feed receiving disk from the disk to which it feeds. Whereas I find a rectilinear arrangement of such feeding means advantageous, for example, when weighing machinery is arranged in rectilinear relationship, my system is sufficiently flexible so that I can deliver feed across a wide variety of arrangement and inter-relationship of disks.

Under some circumstances, it may be advantageous to rely only on centrifugal feed for delivering material from disk to disk. However, it may also be advantageous either partially or entirely to rely on scraping means. I illustrate, for example, in FIGURES 4 and 5, an arrangement in which scrapers 30 may be secured to the top plate 5 and depend downwardly toward the upper surface of the disks 17. In that event, the discharge may be partly or almost entirely caused by the actual engagement of the fed material with the deflectors 30 in response to rotation of the disks 17.

Also, under some circumstances, it may be advantageous to assist in the propelling and feed discharge process by employing vanes on the disks. I illustrate, for example, in FIGURE 6, a disk 40 having a sequence of more or less spiral vanes 41 extending curvilinearly outwardly from the center or hub of the disk. Such vanes may be used with or without the employment of deflectors such as are shown, for example, at 30 in FIGURE 5. In general, I prefer to avoid the use of such vanes as the non-packing action elsewhere herein discussed is best obtained by the employment of smooth feed disks lying in parallel planes and rotating about parallel axes, as shown in FIGURE 2. Any wobble of the disks may, when used with easily damaged material, produce disadvantageous packing between the disks.

It will be understood, also, that I may widely vary the shape or contour of the disk. The disks may be flat, as shown in FIGURES 1 and 5, or they may be cupped or dished or made conic, in various ways. One example is illustrated in FIGURE 7, where a disk 50 is shown as having a central, downwardly and outwardly flared distributing hub 51. Clearly, the contour of this hub may itself be widely varied, and the particular showing of FIGURE 1 is given as a matter of illustration rather than as restriction.

It will be realized that whereas I have described and illustrated a practical and operative device, and various forms thereof, nevertheless, many changes may be made in the size, shape, number and disposition of parts without departing from the spirit of my invention. I therefore wish my description and drawings to be taken as in a broad sense illustrtive or diagrammatic, rather than as limiting me to my specific structure or showing herein, or to the particular sequence of method steps herein described.

In particular, whereas I have shown a plurality of downspouts or feed receiving members 12, my invention may be applied to a single downspout, or may be used independent of any particular discharge or downspouting, since it is the spreading or equalizing function of the system which is important rather than the details of the downward discharge of the material handled.

The use and operation of the invention are as follows:

Considering the simplest example of my feeding method and apparatus, a single member, such as 17b of FIGURE 2, is positioned to receive a stream of fed material. An edge or a part of the member 17b is in line with the feed delivered, for example, along a suitable chute or spout 6. It may be practical to deliver the entire body of feed to a single disk. This disk, in turn, is so positioned and so rotated as to deliver part of the received feed to a feed receiving member, such as, for example, one of the hoppers 12, while, at the same time, delivering another part to an adjacent disk 17. If the two disks are simultaneously rotated it will be understood that some of the feed will escape over the edge of one disk and some over the edge of the other, to enter two or more hoppers, such as 12. In the particular illustration herein given, a single pipe 6 delivers simultaneously to two rotating disks and these, in turn, deliver to other disks, in this instance underlying, until the feed has traveled in part to both ends of the housing in which the various disks are simultaneously rotated. If material is not withdrawn from the feeder, the feeder will fill up but will not pack. When the feeder is in a filled condition the disks merely rotate or slide through the piled material. I wish to emphasize that by my system or invention, material is distributed uniformly throughout the described system. If one or more of the hoppers are not in use and thus do not discharge and become filled with material, the only result is that the material on the upper surfaces of the disks cannot be discharged. If the material piles above the upper surfaces of the disks the disks merely slide in relation to the material and there is no packing or breaking action. Even the most delicate material can be handled and distributed, such as corn flakes, potato chips and the like. There is no packing and no breakage or degradation of the particles. No matter how many of the hoppers 12 are out of operation or use, the material in the system is distributed uniformly. If, for example, the right hand hopper 12, referring to the position of the parts in FIGURE 2, is filled with material, the material on the disk above it cannot escape downwardly. There may, in that event, be a back flow to the other disks as, under all normal circumstances, the material maintains its even distribution throughout the system. The system discharges material only when the material has some place to go, and the material which is not discharged is evenly distributed throughout the system.

Broadly stated, my system is directed toward spreading material in a supply area, which may be a hopper, thus insuring a uniform deposit regardless of whether a single large outlet is employed or a multiplicity of smaller outlets. It should be kept in mind that in my system finely divided material may be conveyed or distributed throughout a substantial area, which may be a single discharge area, or an area communicating with a multiplicity of downspouts. An important advantage of the system is that when the product handled has filled the area within whatever hopper or distributor or downspout system is employed, further conveyance of material automatically stops. The individual disks, such as 17, 17a and 17b, may continue to operate, that is to say, rotate, under fully loaded conditions without in any way harming the material, and without causing areas or zones of excess pressure. Assume, for example, that the area beneath the disks in FIGURE 2 is filled with material and cannot receive any further accretion of material. The disks 17, 17a and 17b continue to rotate without doing any damage whatsoever to the material, without any packing or any degradation of particles. The flow of material from above, for example, through the inlet 6, therefore ceases, since there is no further space available to receive additional particles, but the continuing rotation of the disks does no damage. As soon as material is withdrawn from about and beneath the disks, then the normal process of distribution resumes, and the immediate entrance of additional particles through the inlet 6, 7 is permitted. As a practical matter, my invention is important, since it permits maintaining a uniform product density. This is especially valuable in the case of friable materials. It is also desirable in situations where it is helpful to equalize pressure from large bulk storage areas over the distributing system, preventing heavy or variable pressure from causing inaccurate feed and resulting in inaccurate weights. My system is particularly advantageous in connection with weighing feeders, although it has many other applications. Its prevention of over pressure and damage to individual particles is of vital importance.

I claim:

1. In a distributing supply feeder, feed delivery means adapted to deliver feed generally downwardly along a predetermined path, a rotary feed conveying member having an upper surface positioned to receive feed delivered along said path, a second rotary feed conveying member positioned adjacent the first and having an upper surface positioned to receive material delivered over the edge of the first member, means for rotating said feed conveying members simultaneously about generally parallel, generally upright axes, and one or more separate feed receiving elements positioned to receive material passing over the edges of said rotary feed conveying members.

2. The structure of claim 1, characterized by and including means for scraping material from the upper surfaces of said rotary feed conveying members in response to their rotation.

3. The structure of claim 1, characterized by and including material conveying irregularities formed on the upper surfaces of said feed conveying members.

4. The structure of claim 1, characterized by and including a succession of rotary feed conveying members arranged in a series, the intermediate feed conveying members of the series each being positioned to receive feed from one rotary conveying member and to deliver it to another rotary conveying member.

5. The structure of claim 1, characterized by and including unitary means for rotating said feed conveying members.

6. In a distributing supply feeder, a housing, a plurality of rotary feed conveying members mounted in said housing for rotation about generally upright, generally parallel axes, a plurality of feed receiving discharge elements positioned to receive feed from said feed conveying members, and means for delivering feed generally downwardly toward the upper surface of one of said conveying members for delivery therefrom to others of said feed conveying members, the discharge elements being positioned to receive feed discharged from the edges of said feed conveying members.

7. In a distributing supply feeder, a housing, a plurality of rotary feed conveying members mounted in said housing for rotation about generally upright, generally parallel axes, feed receiving means positioned to receive feed from said feed conveying members, and means for delivering feed generally downwardly upon the upper surface of one of said conveying members for delivery therefrom to others of said conveying members, the feed receiving means being positioned to receive feed discharged from the edges of said feed conveying members.

8. The structure of claim 7 characterized in that the rotary feed conveying members include disks having generally plane smooth upper surfaces, said disks overlapping each other, whereby the disks are free on both upper and lower surfaces from elements limiting their free rotation in relation to the feed, in the event of overfeeding.

9. The structure of claim 7 characterized in that the rotary feed conveying members are provided with vane means on their upper surfaces.

10. In a distributor for hoppers, storage areas and the like, feed delivery means adapted to deliver feed generally downwardly at a predetermined location, a rotary feed conveying member having a generally horizontal uninterrupted upper surface positioned to receive such delivered feed, and additional similar rotary feed conveying members, including one positioned adjacent the first and having an upper surface positioned to receive material delivered over the edge of the first member, each such member being positioned to receive feed delivered from the edge of another adjacent member, and means for rotating said feed conveying members about generally parallel, generally upright axes.

11. The structure of claim 10 characterized in that the hopper or storage area is provided with at least one downward outlet.

12. The structure of claim 10 characterized in that hopper or storage area is provided with a plurality of downward outlets located out of vertical alignment with the feed delivery means.

13. A conveying system which includes a housing surrounding the area in which the material is to be conveyed, a plurality of generally horizontal rotary feed conveying members located within said housing, said housing having side walls extending upwardly about said members, each such member having a generally horizontal uninterrupted upper surface, said members being located adjacent each other, means for rotating said members about generally parallel, generally vertical axes, and means for delivering the material to be conveyed to at least one of them, such members being positioned and adapted to deliver material centrifugally from their outer edges to adjacent members.

14. A method of substantially uniformly distributing material from a feed delivery source throughout a confined material receiving zone at a substantially uniform pressure throughout the zone, said method including the steps of delivering material to be distributed from a feed delivery zone to a localized area or areas in the upper portion of a confined material receiving zone, gravitationally discharging a portion of the material in the localized area or areas substantially directly downwardly towards a material discharging zone, simultaneously delivering the balance of the material from the localized area or areas in generally lateral directions to a new distribution area or areas, gravitationally discharging at least a portion of the material in the new distribution area or areas substantially directly downwardly towards a material discharging zone, and repeating the last two steps as often as necessary to uniformly distribute the material at a substantially uniform pressure throughout the material receiving zone.

15. The method of claim 14 further characterized by and including the final step of discharging the distributed material from a desired number of locations in the confined material receiving zone.

References Cited in the file of this patent

UNITED STATES PATENTS 1,959,108   Read _____ May 15, 1934